United States Patent
Ito

(10) Patent No.: US 9,627,762 B2
(45) Date of Patent: Apr. 18, 2017

(54) ANTENNA DEVICE, COMMUNICATION TERMINAL DEVICE, AND COMMUNICATION TERMINAL DEVICE COVER

(71) Applicant: Murata Manufacturing Co., Ltd., Nagaokakyo-shi, Kyoto-fu (JP)

(72) Inventor: Hiromitsu Ito, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 28 days.

(21) Appl. No.: 14/702,926

(22) Filed: May 4, 2015

(65) Prior Publication Data

US 2015/0236418 A1 Aug. 20, 2015

Related U.S. Application Data

(63) Continuation of application No. PCT/JP2014/074617, filed on Sep. 18, 2014.

(30) Foreign Application Priority Data

Nov. 8, 2013 (JP) .................................. 2013-231767

(51) Int. Cl.
*H01Q 7/00* (2006.01)
*H01Q 7/06* (2006.01)
(Continued)

(52) U.S. Cl.
CPC ......... *H01Q 7/00* (2013.01); *G06K 19/07779* (2013.01); *H01Q 1/2216* (2013.01); *H01Q 1/38* (2013.01); *H01Q 7/06* (2013.01)

(58) Field of Classification Search
CPC .. H01Q 7/06; H01Q 7/08; H01Q 1/38; H01Q 1/2208; H01Q 1/2216; H01Q 1/2225;
(Continued)

(56) References Cited

U.S. PATENT DOCUMENTS

| 2007/0051807 A1 | 3/2007 | Yamaguchi |
| 2013/0147670 A1 | 6/2013 | Nakano et al. |
| 2014/0176382 A1 | 6/2014 | Nakano et al. |

FOREIGN PATENT DOCUMENTS

| JP | 5-240050 A | 9/1993 |
| JP | 4325621 B2 | 9/2009 |

(Continued)

OTHER PUBLICATIONS

Machine translation of JP 2013-081072 A.*
Official Communication issued in International Patent Application No. PCT/JP2014/074617, mailed on Dec. 2, 2014.

*Primary Examiner* — Howard Williams
(74) *Attorney, Agent, or Firm* — Keating & Bennett, LLP

(57) ABSTRACT

An antenna device includes a feed coil including a coil conductor and being connected to a feed circuit, and an antenna coil including a coil conductor, a portion of the antenna coil being a coupler portion that electromagnetically couples with the feed coil. The winding axis of the coil conductor of the feed coil is not parallel to the direction along which the coil conductor of the antenna coil at the coupler portion extends. Further, at other than the coupler portion, a first magnetic body portion is arranged at a feed coil side of the antenna coil, and at the coupler portion, a second magnetic body portion is arranged at a side of the antenna coil opposite to the feed coil.

19 Claims, 17 Drawing Sheets

(51) Int. Cl.
*H01Q 1/38* (2006.01)
*H01Q 1/22* (2006.01)
*G06K 19/077* (2006.01)

(58) Field of Classification Search
CPC ..................... G06K 19/0779–19/07792; G06K 17/07784–19/07786
See application file for complete search history.

(56) References Cited

FOREIGN PATENT DOCUMENTS

| | | |
|---|---|---|
| JP | 2013-081072 A | 5/2013 |
| WO | 2012/053412 A1 | 4/2012 |
| WO | 2012/173080 A1 | 12/2012 |

* cited by examiner

FIG. 1A
FIG. 1C
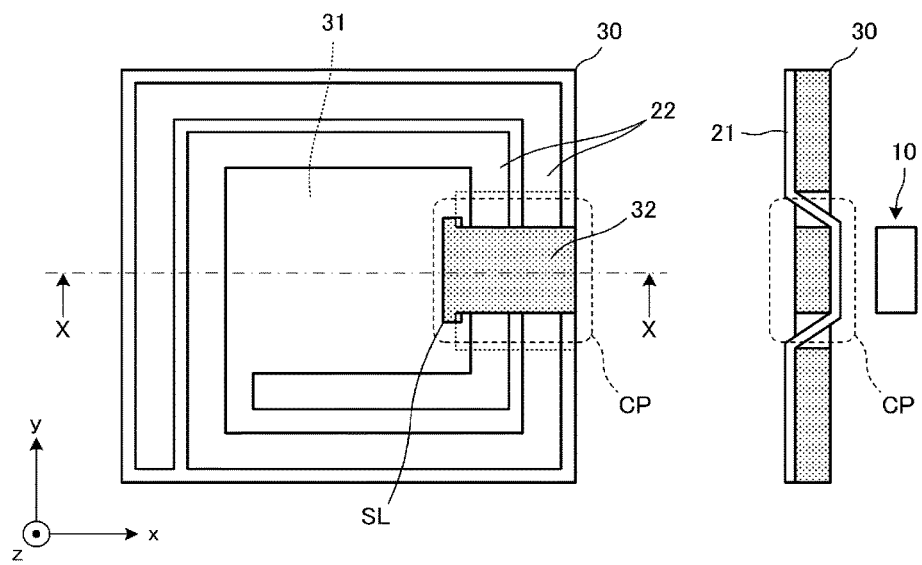
FIG. 1B
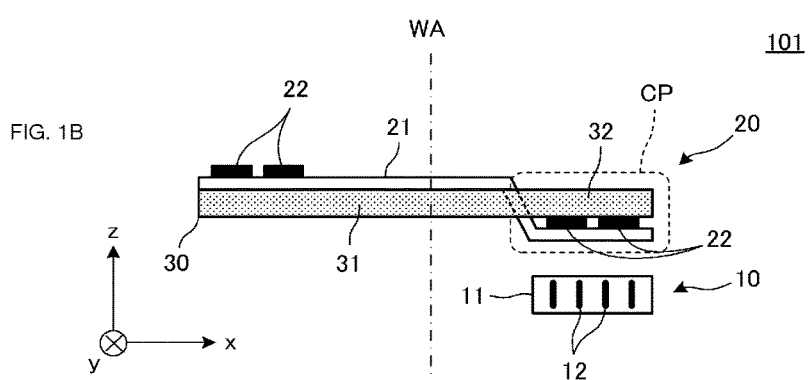

FIG. 7A
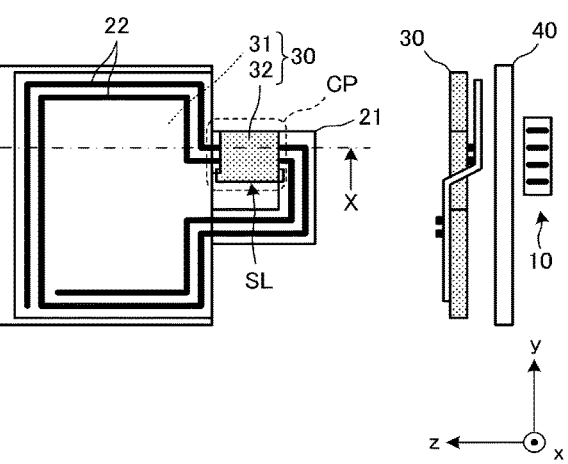
FIG. 7C
FIG. 7B
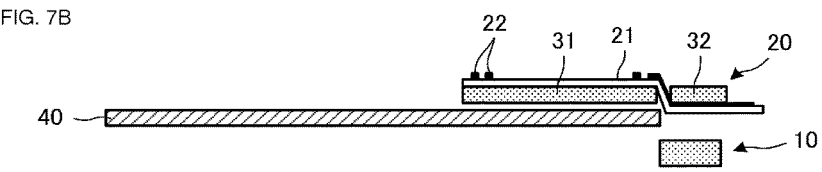

FIG. 11A
FIG. 11C
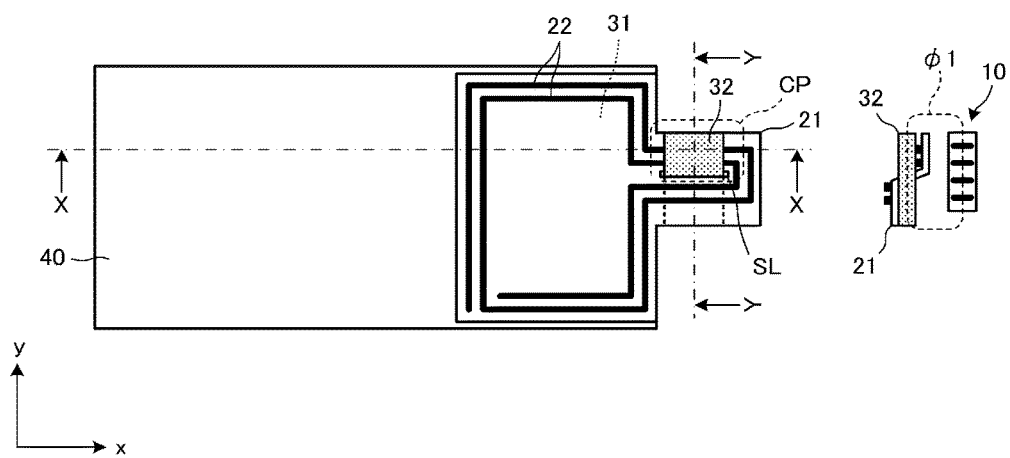
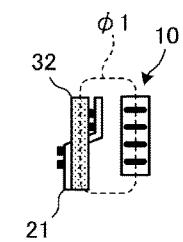
FIG. 11B
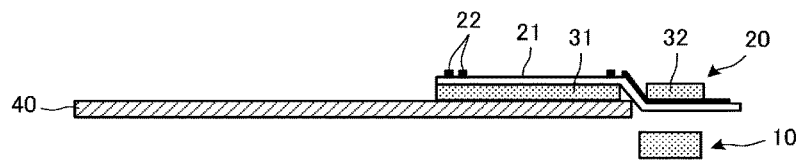

FIG. 14A
FIG. 14B
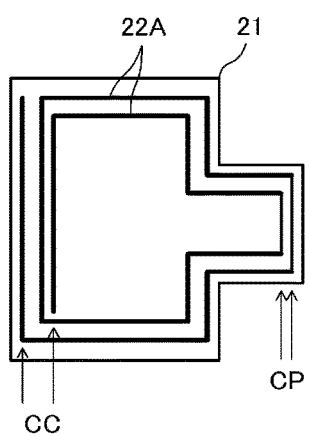
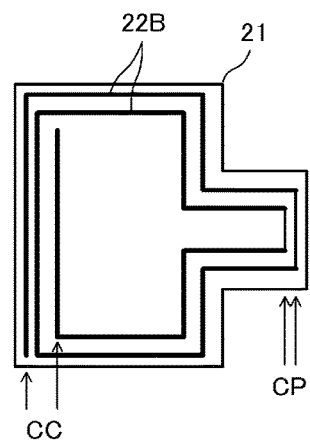
FIG. 15
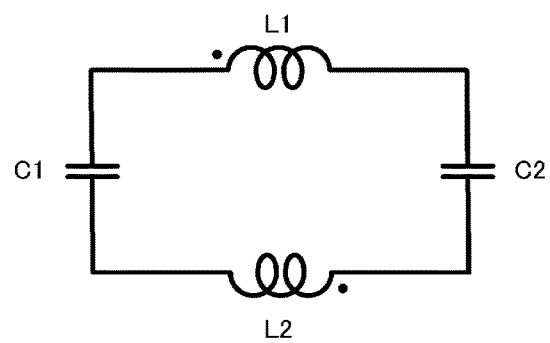

ANTENNA DEVICE, COMMUNICATION TERMINAL DEVICE, AND COMMUNICATION TERMINAL DEVICE COVER

BACKGROUND OF THE INVENTION

1. Field of the Invention

The present invention relates to antenna devices and communication terminal devices. Particularly, the present invention relates to an antenna device for use in HF band RFID tags or reader/writers, a communication terminal device including this antenna device, and a communication terminal device cover.

2. Description of the Related Art

In recent years, HF band RFID systems are introduced into communication terminal devices such as cellular phones and the like so that the communication terminal device itself may be used as a reader/writer or a RFID tag. In such cases, a RFID IC chip is mounted on a printed circuit board, and an antenna is attached on a terminal casing or disposed at available space inside the terminal casing. Thus, the RFID IC chip and the antenna are electrically connected to one another via a flexible cable or a contact pin.

On the other hand, there is a known configuration in which a feed coil connected to a RFID IC chip is mounted on a control board and allows to magnetically couple with an antenna coil, as disclosed in International Publication WO 2012/173080 and Japanese Patent No. 4325621, for example. This configuration allows high frequency signals to be transmitted from the feed coil to the antenna coil via magnetic fields. Thus, the RFID IC chip and the antenna coil may be connected without using the flexible cable or the contact pin.

International Publication WO 2012/173080 discloses a configuration in which a ferrite sheet is attached on a coil antenna (antenna coil) so as to cover the whole surface of the coil antenna at a feed coil side. Japanese Patent No. 4325621 discloses another configuration in which a magnetic sheet is attached on a loop antenna (antenna coil) so as to cover, of the surface of the loop antenna at a chip type coil (feed coil) side, a section other than a section facing the chip type coil.

In the configuration described in International Publication No. WO 2012/173080, the ferrite sheet is arranged between the feed coil and the antenna coil. Thus, in cases where the distance between the feed coil and the antenna coil becomes too large, sufficient magnetic coupling may not be obtained. Further, in the configuration described in Japanese Patent No. 4325621, the size of the magnetic sheet to be attached to the antenna coil becomes smaller. This reduces the inductance value of the antenna coil, making it difficult to obtain sufficient magnetic coupling. In other words, in the configurations of the prior art references discussed above, it is difficult to improve transmission efficiency of signals between the feed coil and the antenna coil.

SUMMARY OF THE INVENTION

Preferred embodiments of the present invention provide an antenna device having higher transmission efficiency between the feed coil and the antenna coil, a communication terminal device including the antenna device, and a communication terminal device cover.

A communication terminal device according to a preferred embodiment of the present invention includes a casing; a feed circuit disposed inside the casing; a communication terminal device cover disposed outside the casing; and an antenna device including a feed coil including a coil conductor and being connected to a feed circuit; and an antenna coil including a coil conductor, a portion of the antenna coil being a coupler portion that electromagnetically couples with the feed coil; wherein a winding axis of the coil conductor of the feed coil and a direction along which the coil conductor of the antenna coil at the coupler portion are skewed relative to each other; at a location other than the coupler portion, a first magnetic body portion is arranged at a feed coil side of the antenna coil; at the coupler portion, a second magnetic body portion is arranged at a side of the antenna coil opposite to the feed coil side; and the antenna coil is disposed on a surface of or inside the communication terminal device cover.

The foregoing configuration increases the degree of coupling (coupling coefficient) between the feed coil and the antenna coil. The feed coil is often mounted on a mounting board, and that mounting board is often provided with a conductor layer (for example, ground and the like). Even in such a case, at a section of the antenna coil other than the coupler portion, the first magnetic body portion is arranged at the feed coil side. Thus, the first magnetic body portion defines and operates as a magnetic shielding layer for the conductor layer of the mounting board on which the feed coil is mounted. This significantly reduces or prevents the induction of eddy currents at the conductor layer and significantly reduces or prevents the loss. In addition, this configuration makes it easy to add the antenna coil by covering the communication terminal device body with the cover.

Preferably, a communication device according to a preferred embodiment of the present invention further includes a mounting board arranged inside the casing, wherein the feed coil is mounted on the mounting board. This configuration facilitates the mounting of the feed coil and the securing of the space for mounting the feed coil.

In cases where a communication device according to a preferred embodiment of the present invention further includes a conductor layer (metal member or ground electrode) disposed inside the casing, it is preferable that the first magnetic body portion is arranged between the conductor layer and the antenna coil. This configuration allows the first magnetic body portion to operate as a magnetic shielding layer for the conductor layer and significantly reduce or prevent the induction of eddy currents at the conductor layer, thus significantly reducing or preventing the loss.

Preferably, the coil conductor of the feed coil is configured such that the extent of winding expands along a direction of the winding axis of the feed coil, and the coil conductor of the antenna coil preferably has a spiral shape or a ring shape. This configuration allows the feed coil and the antenna coil to provide coupling with high efficiency and improves radiation efficiency by providing the antenna coil that is larger than the feed coil.

Preferably, the antenna coil includes an insulator sheet on which the coil conductor is provided, the first magnetic body portion and the second magnetic body portion are preferably sheet-shaped, and the first magnetic body portion and the second magnetic body portion are attached to the insulator sheet. This configuration enables a multilayer structure of the antenna coil and the first and second magnetic bodies to be thinner.

Preferably, the insulator sheet includes a slit, the first magnetic body portion and the second magnetic body portion are portions of a single magnetic body, and of the single magnetic body, the second magnetic body portion is a portion to be inserted into the slit of the insulator sheet. This configuration allows reducing the number of components. Further, in this configuration, it is only necessary to insert the second magnetic body portion into the slit of the insulator sheet. The configuration is simple and provides flexibility in arranging the first magnetic body portion and the second magnetic body portion to their suitable positions.

Preferably, the line width of the coil conductor of the antenna coil is narrower at the coupler portion compared to that at a section other than the coupler portion. This configuration increases the magnetic flux that contributes to the coupling between the feed coil and the antenna coil, thus increasing the degree of coupling.

Preferably, the coil conductor of the feed coil is provided on a magnetic base. This configuration increases the inductance value of the feed coil. Thus, the feed coil is made smaller by that amount. In other words, despite of its smaller size, the degree of coupling with the antenna coil via magnetic fields increases.

Preferably, the coil conductor of the antenna coil is configured to include a plurality of layers. This configuration allows generation of desired capacitance between coil conductors that are provided on different layers and facilitates the configuration of the antenna coil at a predetermined resonance frequency.

A communication device according to another preferred embodiment of the present invention includes a casing; a feed circuit disposed inside the casing; and an antenna device including a feed coil including a coil conductor and being connected to a feed circuit; and an antenna coil including a coil conductor, a portion of the antenna coil being a coupler portion that electromagnetically couples with the feed coil; wherein a winding axis of the coil conductor of the feed coil and a direction along which the coil conductor of the antenna coil at the coupler portion are skewed relative to each other; at a location other than the coupler portion, a first magnetic body portion is arranged at a feed coil side of the antenna coil; at the coupler portion, a second magnetic body portion is arranged at a side of the antenna coil opposite to the feed coil side; the antenna coil is disposed on a surface of or inside the casing; the casing includes a conductor portion; an opening is provided in the conductor portion; and in a planar view, the coupler portion of the antenna coil overlaps the opening. This configuration makes it easy to secure the space to install the antenna coil and reduces the overall size.

Preferably, in a communication device according to a preferred embodiment of the present invention, the casing includes a conductor portion, an opening is provided on the conductor portion, and in a planar view, the coupler portion of the antenna coil overlaps the opening. This configuration achieves coupling of the feed coil and the antenna coil.

Preferably, the size of the opening is more than about three times larger than the size of the feed coil. This configuration sufficiently increases the degree of coupling between the feed coil and the antenna coil.

A communication terminal device cover according to a preferred embodiment of the present invention is the communication terminal device cover used in the communication terminal device described in one of the preferred embodiments of the present invention described above.

According to various preferred embodiments of the present invention, an antenna device having higher transmission efficiency between the feed coil and the antenna coil and a communication terminal device incorporating this antenna device are provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 1A, 1B, and 1C are views depicting the configuration of an antenna device according to a first preferred embodiment of the present invention.

FIGS. 7A, 7B, and 7C are views depicting the configuration of another antenna device according to the second preferred embodiment of the present invention.

FIGS. 11A, 11B, and 11C are views depicting the configuration of an antenna device according to a fourth preferred embodiment of the present invention with a conductor layer 40.

FIG. 14A is a plan view of an antenna coil in an antenna device according to a seventh preferred embodiment of the present invention, and FIG. 14B is a view depicting a pattern of a coil conductor 22B provided on the lower surface of an insulator sheet 21.

FIG. 15 is an equivalent circuit diagram of an antenna coil according to the seventh preferred embodiment of the present invention.

DETAILED DESCRIPTION OF THE PREFERRED EMBODIMENTS

Figure 2A:
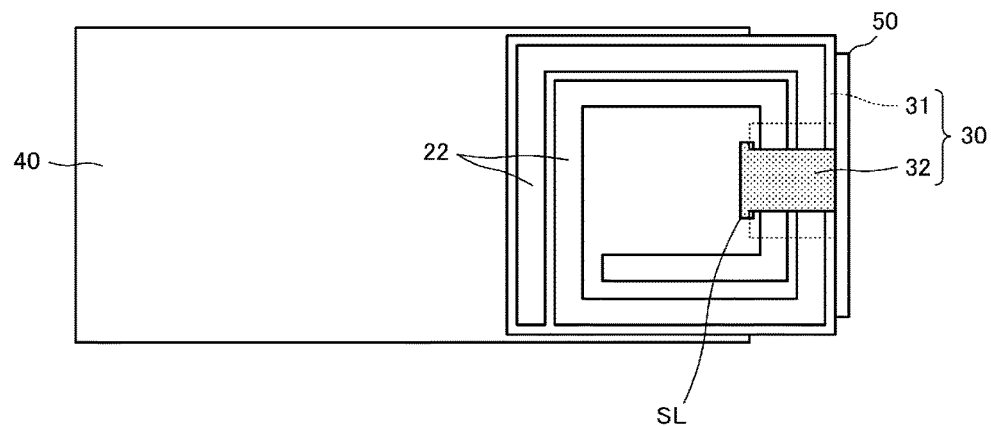
FIGS. 2A and 2B are views depicting a relationship between a structure of a principle portion and a reader/writer-side antenna 200 defining and serving as an antenna of a communicating partner in a state where it is applied to an communication terminal device.

A plurality of preferred embodiments for implementing the present invention is described hereinafter with several specific examples while referring to the drawings. Same reference characters designate same elements throughout the several views. Needless to say, each preferred embodiment is for illustrative purposes only, and constituting elements of different preferred embodiments may be combined or partially exchanged.

First Preferred Embodiment

FIGS. 1A, 1B, and 1C are views depicting the configuration of an antenna device according to the first preferred embodiment of the present invention. FIG. 1A is a plan view, FIG. 1B is a cross sectional view of the portion X-X in FIG. 1A, and FIG. 1C is a right side view.

An antenna device 101 includes a feed coil 10, an antenna coil 20, and a magnetic body 30. The feed coil 10 is connected to a feed circuit. The antenna coil 20 includes a coupler portion CP that generates electromagnetic coupling with the feed coil 10.

The feed coil 10 includes a coil conductor 12 whose pattern is such that the extent of winding expands along a coil winding axis direction (in other words, helical or solenoid).

The antenna coil 20 may be configured, for example, by forming a coil conductor 22 on a PET insulator sheet 21. The coil conductor 22 may have a spiral shape or a ring shape on the surface, for example.

The winding axis of the coil conductor 12 of the feed coil 10 is aligned with the x axis direction. The coil conductor 22 of the antenna coil 20 at the coupler portion CP extends in the y axis direction. Further, the coupler portion CP and the feed coil 10 are lined up along the z axis direction. Thus, the winding axis of the coil conductor 12 of the feed coil 10 is perpendicular or substantially perpendicular to the direction along which the coil conductor 22 of the antenna coil 20 at the coupler portion CP extends when viewed from the z axis direction that is the direction along which the coupler portion CP and the feed coil 10 are lined up.

The winding axis of the coil conductor 12 of the feed coil 10 is aligned with the x axis direction, and a winding axis WA of the coil conductor 22 of the antenna coil 20 is aligned with the z axis direction. At the coupler portion CP of the antenna coil 20, the coil conductor 22 extends in the y axis direction. Accordingly, the winding axis of the coil conductor of the feed coil 10 is perpendicular or substantially perpendicular to the winding axis of the coil conductor 22 of the antenna coil 20, and is perpendicular or substantially perpendicular to the direction along which the coil conductor 22 of the antenna coil 20 extends at the coupler portion CP of the antenna coil 20.

Here, the term "perpendicular" is the concept that is not limited to the strict mathematical definition of perpendicularity, but also includes substantially perpendicular cases. For example, crossing within a range of 90 degrees±15 degrees is considered to be "perpendicular".

The magnetic body 30 preferably is made of ferrite and is sheet-shaped, and is a single body including a first magnetic body portion 31 and a second magnetic body portion 32. A slit SL is provided at the insulator sheet 21 of the antenna coil 20, and the second magnetic body portion 32 is inserted into this slit SL. At a section of the antenna coil 20 other than the coupler portion CP, the first magnetic body portion 31 is arranged at the feed coil 10 side. In other words, at the section of the antenna coil 20 other than the coupler portion CP, the first magnetic body portion 31, the feed coil 10, and the coil conductor 22 of the antenna coil 20 are arranged in such a way that the first magnetic body portion 31 is interposed between the coil conductor 22 and the feed coil 10. At the coupler portion CP of the antenna coil 20, the second magnetic body portion 32 is arranged at the side opposite to the feed coil 10. In other words, at the coupler portion CP of the antenna coil 20, the second magnetic body portion 32, the feed coil 10, and the coil conductor 22 are arranged in such a way that the coil conductor 22 is interposed between the feed coil 10 and the second magnetic body portion 32.

There are several ways of expressing the definition of the foregoing coupler portion CP. For example, any one of the following expressions may be used.

(1) Of the coil conductor 22 of the antenna coil 20, a portion that couples with the feed coil 10: Such portion is not limited to a section of the antenna coil 20 that overlaps the feed coil 10 in a planar view.

(2) Typically, of the coil conductor 22 of the antenna coil 20, a section at which the feed coil 10 overlaps with the antenna coil 20 in a planar view: However, it is not limited to the section where the most intense coupling is provided between the antenna coil 20 and the feed coil 10. Here, the term "section that overlaps" indicates the section that overlaps or substantially overlaps, and represents the broader concept that includes a section that overlaps as well as its vicinity or surrounding area.

Typically, in the antenna coil 20, a LC resonance circuit is generated from the inductance of the coil conductor and the stray capacitance between the coil conductors, and resonates at a frequency corresponding to a carrier frequency of communication signals. The resonance frequency may be adjusted by connecting (mounting) a component having capacitance to the coil conductor.

Figure 2B:
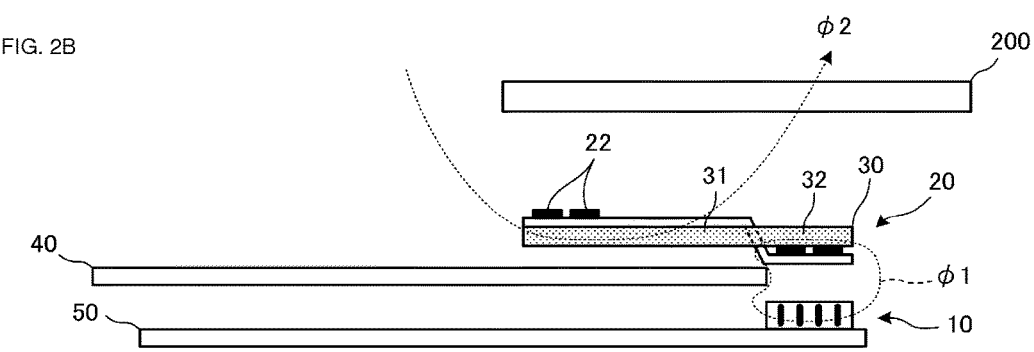

FIGS. 2A and 2B are views depicting a relationship between a structure of a principle portion of a communication terminal device and a reader/writer-side antenna 200 defining and serving as an antenna of a communicating partner in a state where it is applied to the communication terminal device. FIG. 2A is a plan view of the principle portion, and FIG. 2B is a front view of the principle portion. The feed coil 10 is surface-mounted on a mounting board 50. The feed coil 10 and the feed circuit, to which this feed coil 10 is connected, define a resonance circuit that resonates at a frequency corresponding to a carrier frequency of communication signals.

As illustrated in FIGS. 2A and 2B, the feed coil 10 couples with the antenna coil 20 via a magnetic flux $\phi 1$, and the antenna coil 20 couples with the reader/writer-side antenna 200 via a magnetic flux $\phi 2$.

The antenna coil 20 and a conductor layer 40 such as, for example, a shielding metal plate or the like are arranged inside a casing of the communication terminal device (inside surrounded by the casing) in such a way that the first magnetic body portion 31 is interposed between the conductor layer 40 and the coil conductor 22 of the antenna coil 20. This configuration allows the coil conductor 22 of the antenna coil 20 to significantly reduce or prevent the induction of eddy currents at the conductor layer 40. Further, no magnetic body is present between the second magnetic body portion 32 and the feed coil 10, and the conductor layer 40 is not interposed therebetween. Thus, the degree of coupling between the feed coil 10 and the antenna coil 20 is higher, and eddy-current loss is smaller.

Further, the second magnetic body portion 32 defines a magnetic path that passes the magnetic flux φ1 by arranging the second magnetic body portion 32 such that the coil conductor 22 is located between the feed coil 10 and the second magnetic body portion 32 at the coupler portion CP of the antenna coil 20. This causes the magnetic flux φ1 to penetrate the vicinity of the coil conductor 22 of the antenna coil 20, thus increasing the degree of coupling between the feed coil 10 and the antenna coil 20.

Figure 3:
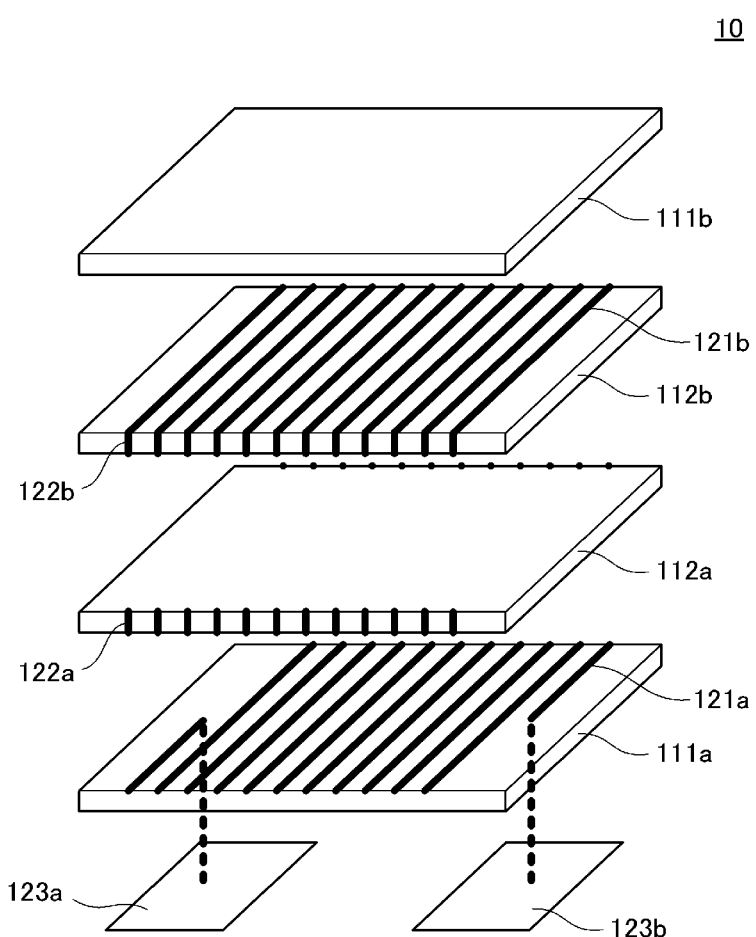
FIG. 3 is an exploded perspective view of a feed coil 10.

FIG. 3 is an exploded perspective view of the feed coil 10. The feed coil 10 preferably is formed by wrapping a magnetic base including a sintered ferrite body with a coil pattern. Specifically, as illustrated in FIG. 3, the magnetic base includes a magnetic layer 112a and a magnetic layer 112b. A base body of the feed coil has a multilayer structure in which these magnetic layers 112a and 112b are located between non-magnetic layers 111a and 111b. An in-plane conductor 121a is provided on the non-magnetic layer 111a. The in-plane conductor 121a constitutes a portion of the coil conductor 12. An in-plane conductor 121b is provided on the magnetic layer 112b. The in-plane conductor 121b constitutes a portion of the coil conductor 12. End surface conductors 122a and 122b are provided on both end surfaces of the magnetic layers 112a and 112b, respectively. The end surface conductors 122a and 122b constitute a portion of the coil conductor 12. Input/output terminals 123a and 123b are provided on the lower surface of the non-magnetic layer 111a. Via-hole conductors are provided inside the non-magnetic layer 111a to establish electrical connections between the in-plane conductor 121a and the input/output terminals 123a and 123b. The end surface conductors 122a and 122b are halves (separated portions) of through-hole conductors or via-hole conductors inside which conductor films are provided. The through-hole conductors or the via-hole conductors are originally formed at the stage of a mother board.

In this way, the coil conductor 12 of the feed coil is defined by the in-plane conductor 121a and 121b and the end surface conductors 122a and 122b.

The magnetic layers 112a, 112b and the non-magnetic layer 111a, 111b are sintered ferrite ceramic layers. The in-plane conductors 121a, 121b and the end surface conductors (through-hole conductors, via-hole conductors) 122a, 122b are sintered bodies of an electrically conductive material whose primary component is silver, copper, or the like and which is printed or filled into a ceramic green sheet that serves a precursor of the sintered ceramic layer.

As described above, the feed coil 10 is configured as a chip component in which a multilayer structure is used as the base body, and is surface-mounted on the mounting board 50 via the input/output terminals 123a and 123b.

Figure 4A:
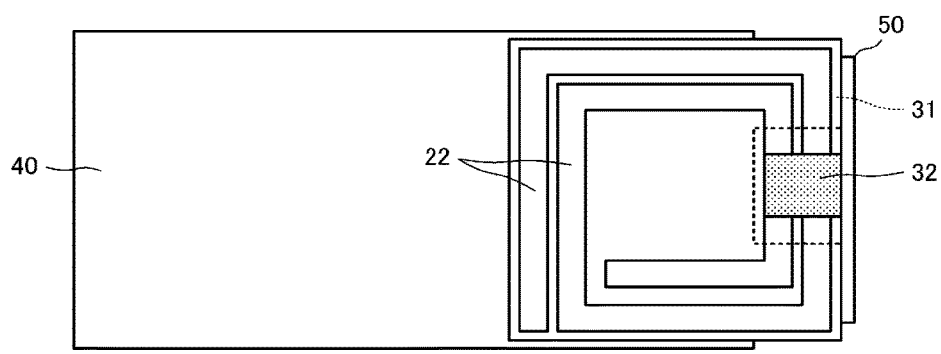
FIGS. 4A and 4B are views depicting a structure of a principle portion in a state where it is applied to a communication terminal device including another antenna coil 20 that is different from the antenna device illustrated in FIGS. 1A-1C.
Figure 4B:
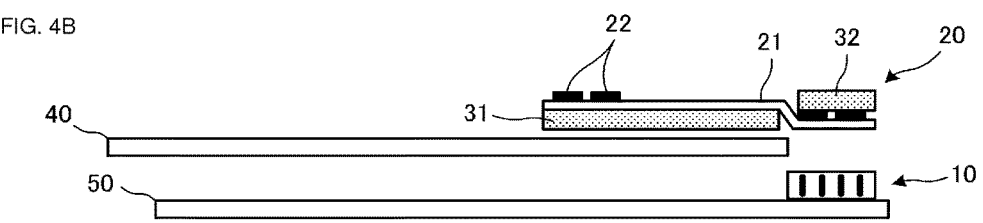

FIGS. 4A and 4B are views depicting a structure of a principle portion of an antenna device that is different from the antenna device illustrated in FIGS. 1A-1C. FIG. 4A is a plan view of the principle portion in a state where the antenna device is applied to a communication terminal device, and FIG. 4B is a front view of the principle portion. The present antenna device is different from the antenna coils 20 illustrated in FIGS. 1A-1C and FIGS. 2A and 2B, and the first magnetic body portion 31 and the second magnetic body portion 32 are separate components. The first magnetic body portion 31 and the second magnetic body portion 32 preferably are made of ferrite and sheet-shaped. The first magnetic body portion 31 is attached to the lower surface of the insulator sheet 21. The second magnetic body portion 32 is attached to the upper surface of the insulator sheet 21. As described above, the first magnetic body portion 31 and the second magnetic body portion 32 may be separated.

Figure 5:
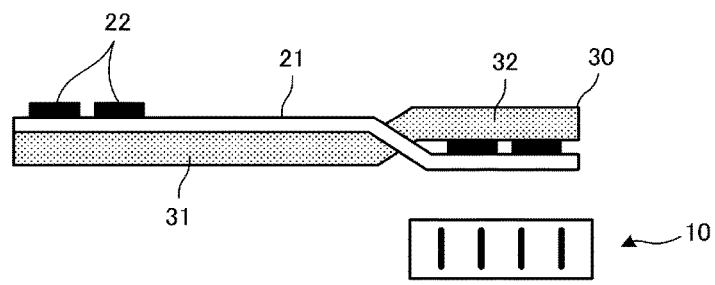
FIG. 5 is a front view of another antenna coil 20 that is different from the antenna device illustrated in FIGS. 1A-1C.

FIG. 5 is a front view of an antenna device that is different from the antenna device illustrated in FIGS. 1A-1C. The present antenna device is different from the antenna devices illustrated in FIGS. 1A-1C and FIGS. 2A and 2B. Here, the magnetic body 30 is soft or flexible. The magnetic body 30 preferably is, for example, formed by shaping a resin material in which ferrite powder is kneaded into a sheet shape. Thus, as illustrated in FIG. 5, the magnetic body 30 is bended (curved) near a border between the first magnetic body portion 31 and the second magnetic body portion 32. As described above, the soft or flexible magnetic sheet may be used.

In the case where the winding axis of the coil conductor 12 of the feed coil 10 is parallel or substantially parallel to the direction along which the coil conductor 22 of the antenna coil 20 at the coupler portion CP extends, a magnetic flux loop generated by the feed coil 10 does not interlink with the coil conductor 22 of the antenna coil 20 at the coupler portion CP.

Further, for example, in the case where the winding axis of the coil conductor 12 of the feed coil 10 is parallel or substantially parallel to the z axis direction illustrated in FIGS. 1A-1C and is in a relationship such that the winding axis of the coil conductor 12 intersects the coil conductor 22 of the antenna coil 20 at the coupler portion CP, the antenna device operates in the following manner. In this case, the direction of the magnetic flux generated in the vicinity of a coil conductor portion changes depending on whether the coil conductor portion is positioned on the right side of the coil conductor 22 in the x axis direction (first coil conductor portion) or on the left side (second coil conductor portion) with respect to the location where the intersecting occurs. These magnetic fluxes of different directions induce currents of different directions at the foregoing first coil conductor portion and second coil conductor portion, respectively. The induced currents of different directions cancel out each other. Thus, the feed coil 10 does not couple with the antenna coil 20.

On the other hand, in the case where the winding axis of the coil conductor 12 of the feed coil 10 and the direction along which the coil conductor of the antenna coil 20 at the coupler portion CP extends do not intersect one another, the foregoing cancellation of the induced currents does not occur. Thus, the feed coil 10 couples with the antenna coil 20.

Accordingly, it suffices that the winding axis of the coil conductor 12 of the feed coil 10 and the direction along which the coil conductor 22 of the antenna coil 20 at the coupler portion CP extends are not parallel and not intersecting with each other. In other words, it suffices that they are in a relationship of "skewed positions (skew lines)".

Second Preferred Embodiment

Figure 6A:
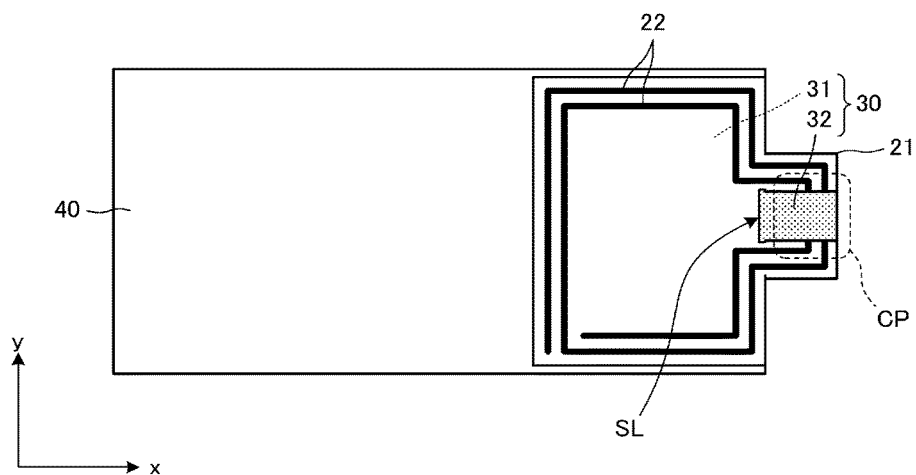
FIGS. 6A and 6B are views depicting the configuration of an antenna device according to a second preferred embodiment of the present invention.
Figure 6B:
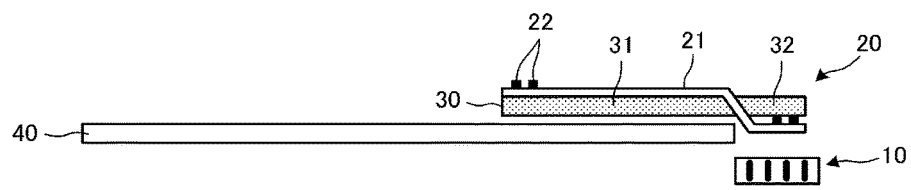

FIGS. 6A and 6B are views depicting the configuration of an antenna device according to the second preferred embodiment of the present invention. Here, the antenna device is illustrated together with the conductor layer 40 that comes close thereto in a state where it is applied to a communication terminal device. FIG. 6A is a plan view of the antenna device, and FIG. 6B is a front view of the antenna device.

In this example, the coil conductor 22 of the antenna coil 20 protrudes to the x axis direction in the plane at the coupler portion CP. In association with the above, the first magnetic body portion 31 and the second magnetic body portion 32 each preferably has a rectangular or substantially rectangular shape. This configuration allows the shape of the magnetic body 30 to be simplified, thus reducing the cost.

FIGS. 7A, 7B, and 7C are views depicting the configuration of another antenna device according to the second preferred embodiment of the present invention. In this example, again, the antenna device is illustrated together with the conductor layer 40 that comes close thereto in a state where it is applied to a communication terminal device. FIG. 7A is a plan view of the antenna device, and FIG. 7B is a cross sectional view of the portion X-X in FIG. 7A.

In this example, the coil conductor 22 of the antenna coil 20 protrudes to the x axis direction in the plane at the coupler portion CP. Further, the second magnetic body portion 32 protrudes to the x axis direction and bends at a right angle to further extend in the y axis direction. The feed coil 10 is arranged below the coupler portion CP of the antenna coil 20. The winding axis of the feed coil 10 is aligned with the y axis direction. Thus, the feed coil 10 and the antenna coil 20 generate electromagnetic coupling (mostly magnetic coupling).

Figure 8A:
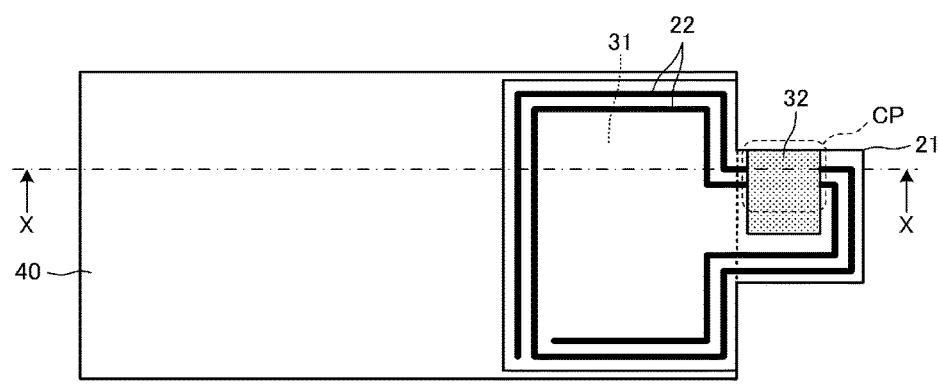
FIGS. 8A and 8B are views depicting the configuration of still another antenna device according to the second preferred embodiment of the present invention.
Figure 8B:
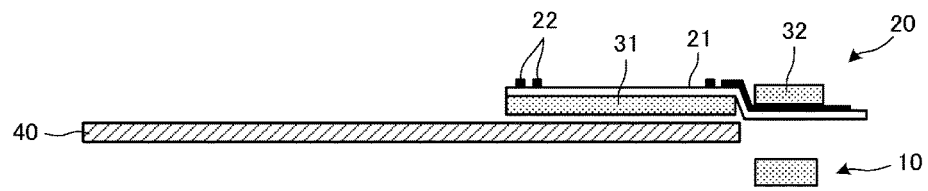

FIGS. 8A and 8B are views depicting the configuration of still another antenna device according to the second preferred embodiment of the present invention. In this example, again, the antenna device is illustrated together with the conductor layer 40 that comes close thereto in a state where it is applied to a communication terminal device. FIG. 8A is a plan view of the antenna device, and FIG. 8B is a front view of the antenna device. The present antenna device is different from the antenna device illustrated in FIGS. 7A, 7B, and 7C, and the first magnetic body portion 31 and the second magnetic body portion 32 are separate components. The first magnetic body portion 31 and the second magnetic body portion 32 preferably are made of ferrite and sheet-shaped. The first magnetic body portion 31 is attached to the lower surface of the insulator sheet 21. The second magnetic body portion 32 is attached to the upper surface of the insulator sheet 21. As described above, the first magnetic body portion 31 and the second magnetic body portion 32 may be separated from each other.

Third Preferred Embodiment

Figure 9A:
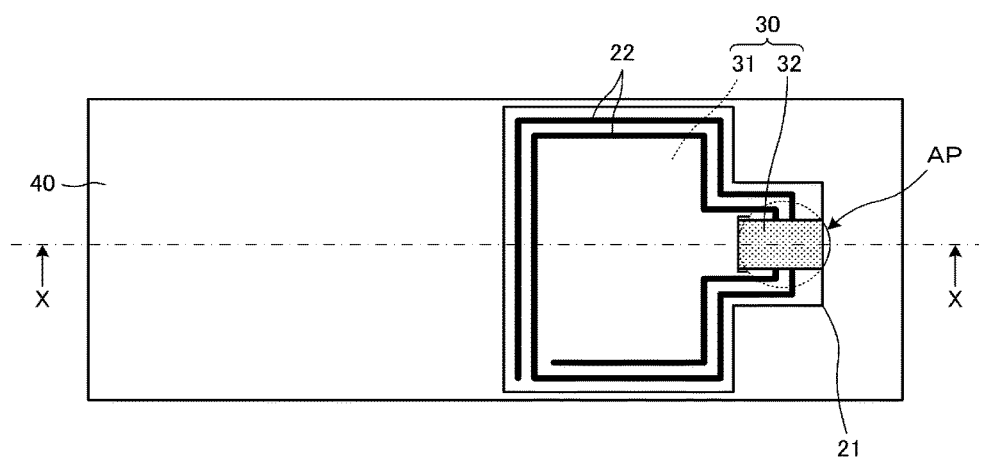
FIGS. 9A and 9B are views depicting the configuration of an antenna device according to a third preferred embodiment of the present invention.
Figure 9B:
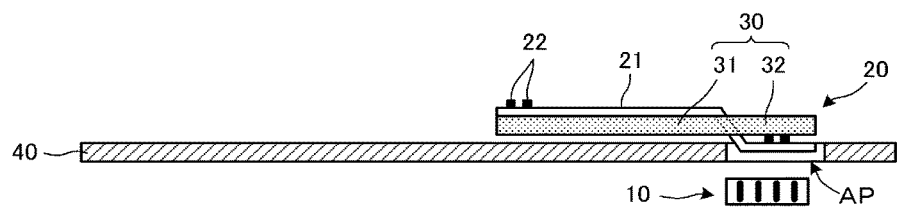

FIGS. 9A and 9B are views depicting the configuration of an antenna device according to the third preferred embodiment of the present invention. Here, the antenna device is illustrated together with the conductor layer 40 that comes close thereto in a state where it is applied to a communication terminal device. FIG. 9A is a plan view of the antenna device, and FIG. 9B is a cross sectional view of the portion X-X in FIG. 9A.

In the first and second preferred embodiments of the present invention, there are described the examples in which the second magnetic body portion 32 is arranged outside the outline of the conductor layer 40 in a planar view. However, in the case where the conductor layer 40 is provided with a conductor opening AP, the second magnetic body portion 32 and the feed coil 10 may be arranged so as to overlap the opening AP. This configuration allows the feed coil 10 and the antenna coil 20 to generate electromagnetic coupling (mostly magnetic coupling) at the position of the opening AP of the conductor layer 40.

Figure 10A:
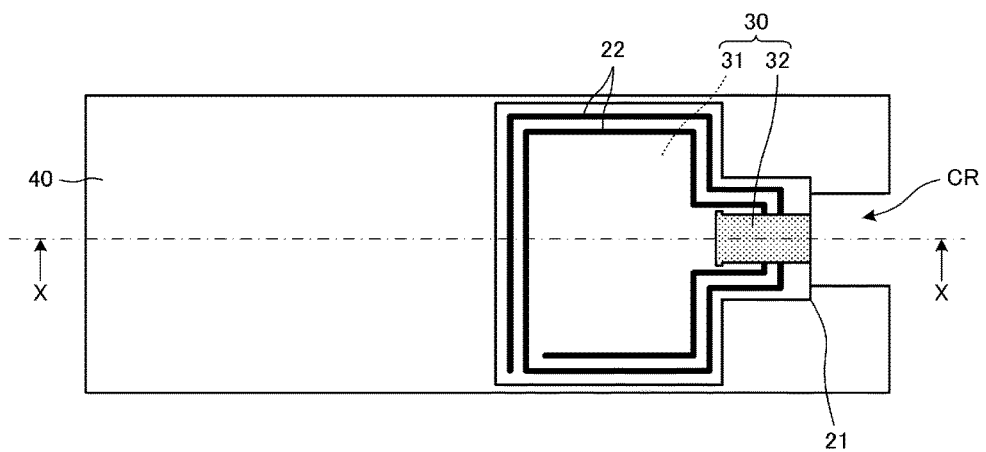
FIGS. 10A and 10B are views depicting the configuration of another antenna device according to the third preferred embodiment of the present invention.
Figure 10B:
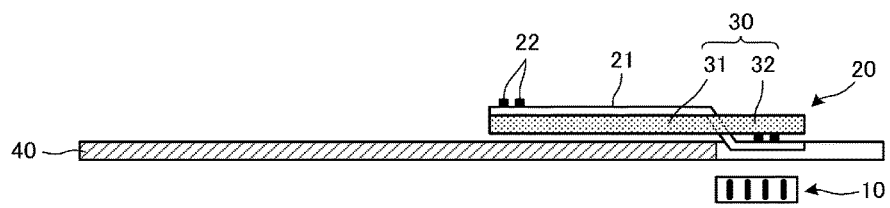

FIGS. 10A and 10B are views depicting the configuration of another antenna device according to the third preferred embodiment of the present invention. In this example, again, the antenna device is illustrated together with the conductor layer 40 that comes close thereto in a state where it is applied to a communication terminal device. FIG. 10A is a plan view of the antenna device, and FIG. 10B is a cross sectional view of the portion X-X in FIG. 10A.

In a case where the conductor layer 40 is provided with a notched portion CR, the second magnetic body portion 32 and the feed coil 10 may be arranged so as to overlap the notched portion CR in a planar view. This configuration allows the feed coil 10 and the antenna coil 20 to generate electromagnetic coupling (mostly magnetic coupling) at the position of the notched portion CR of the conductor layer 40.

The notched portion CR of the conductor layer 40 may be configured to avoid, for example, a camera or any other projected component. By utilizing such a notched portion, the antenna device may be installed inside an electronic device such as the communication terminal device and the like. This improves flexibility in arrangement of the antenna device in the electronic device.

Fourth Preferred Embodiment

FIGS. 11A, 11B, and 11C are views depicting the configuration of an antenna device according to the fourth preferred embodiment of the present invention with the conductor layer 40. FIG. 11A is a plan view of the antenna device, FIG. 11B is a cross sectional view of the portion X-X in FIG. 11A, and FIG. 11C is a cross sectional view of the portion Y-Y in FIG. 11A.

The present antenna device is different from the antenna device illustrated in FIGS. 8A and 8B in that the slit SL is provided at the insulator sheet 21 and the second magnetic body portion 32 is inserted into this slit SL. Further, a half of the second magnetic body portion 32 is arranged above the coil conductor 22 of the antenna coil 20, and the other half is arranged below the coil conductor 22. At the coupler portion CP, the second magnetic body portion 32 is arranged above the coil conductor 22 of the antenna coil 20. Further, the feed coil 10 is arranged below the second magnetic body portion 32. As described above, the second magnetic body portion 32 may be arranged above and below the coil conductor 22 of the antenna coil 20.

The magnetic flux φ1 in FIG. 11C represents the magnetic flux that contributes to the coupling between the feed coil 10 and the antenna coil 20 at the coupler portion CP. This configuration allows the second magnetic body portion 32 and the feed coil 10 to define and provide a magnetic path, thus allowing more of the magnetic flux effective for the coupling with the antenna coil 20 to penetrate the antenna coil (allow to interlink). Thus, the degree of coupling between the antenna coil 20 and the feed coil 10 is easily improved.

Fifth Preferred Embodiment

Figure 12A:
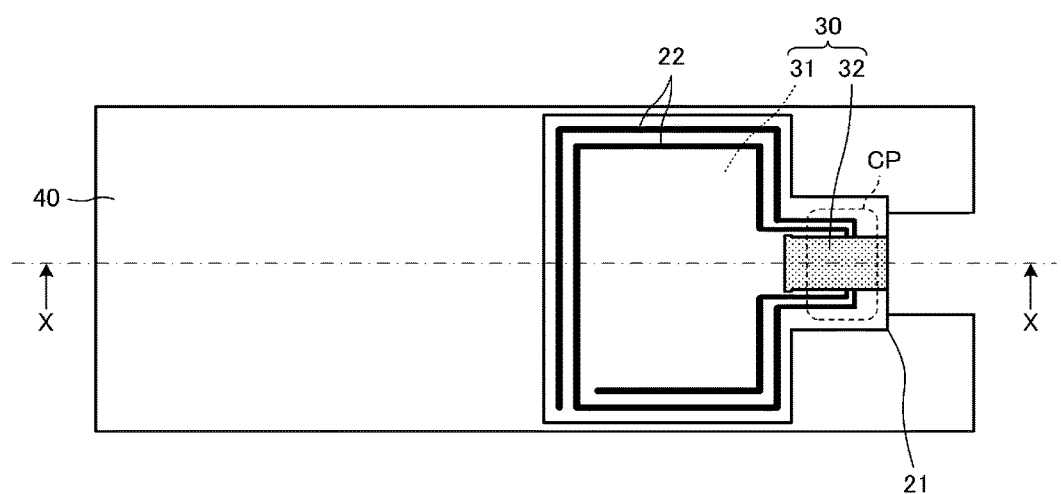
FIGS. 12A and 12B are views depicting the configuration of an antenna device according to a fifth preferred embodiment of the present invention with a conductor layer 40.
Figure 12B:
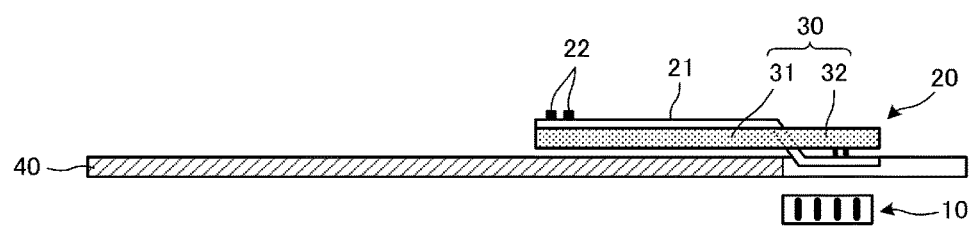

FIGS. 12A and 12B are views depicting the configuration of an antenna device according to the fifth preferred embodiment of the present invention with the conductor layer 40. FIG. 12A is a plan view of the antenna device, and FIG. 12B is a cross sectional view of the portion X-X in FIG. 12A.

The coil conductor 22 of the antenna coil 20 is relatively narrower at the coupler portion CP. In other words, the line width of the coil conductor 22 at the coupler portion CP is narrower than the line width of the coil conductor 22 at the section other than the coupler portion CP. This configuration increases the magnetic flux that contribute to the coupling between the feed coil 10 and the antenna coil 20, thus improving the degree of coupling. This configuration also facilitates the coupling of a smaller feed coil 10.

In the configuration illustrated in FIGS. 1A-1C, the line width of the coil conductor 22 at a portion of the coupler portion CP may be made narrower compared to that of the coil conductor at other than the coupler portion.

Sixth Preferred Embodiment

Figure 13A:
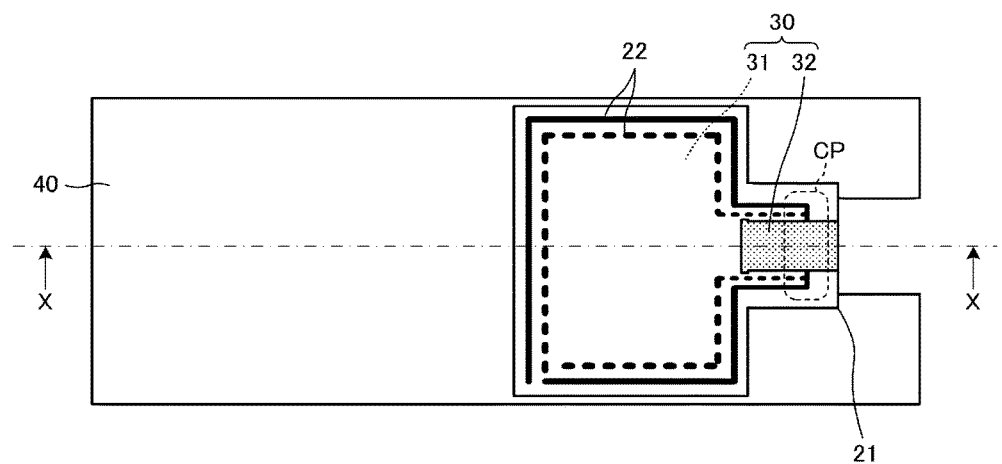
FIGS. 13A and 13B are views depicting the configuration of an antenna device according to a sixth preferred embodiment of the present invention with a conductor layer 40.
Figure 13B:
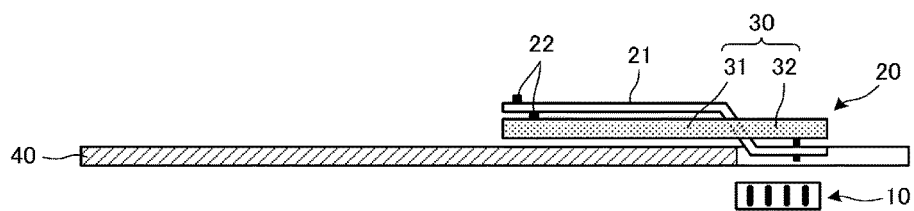

FIGS. 13A and 13B are views depicting the configuration of an antenna device according to the sixth preferred embodiment of the present invention with the conductor layer 40. FIG. 13A is a plan view of the antenna device, and FIG. 13B is a cross sectional view of the portion X-X in FIG. 13A.

The coil conductor 22 of the antenna coil 20 preferably includes two turns running across both sides of the insulator sheet 21. At the coupler portion CP, the line width of the coil conductor 22 is relatively narrower, and the formation width in a planar view is also narrower. In this example, the coil conductor 22 on the upper surface of the insulator sheet 21 and the coil conductor 22 on the lower surface of the insulator sheet 21 overlap one another at the coupler portion CP in a planar view. This configuration increases the magnetic flux that contribute to the coupling between the feed coil 10 and the antenna coil 20, thus improving the degree of coupling.

Seventh Preferred Embodiment

FIG. 14A is a plan view of an antenna coil of an antenna device according to the seventh preferred embodiment of the present invention, and represents a pattern of a coil conductor 22A on the upper surface of the insulator sheet 21. FIG. 14B represents a pattern of a coil conductor 22B on the lower surface of the insulator sheet 21. Note that FIG. 14B is a transparent view from the upper surface without the coil conductor 22A on the upper surface. In FIGS. 14A and 14B, electromagnetic coupling (mostly magnetic coupling) is generated by the feed coil at the coupler portion CP. Further, the coil conductor 22A on the upper surface and the coil conductor 22B on the lower surface generate capacitive coupling at a capacitance forming portion CC. At the coupler portion CP and the capacitance forming portion CC, the coil conductor 22A on the upper surface and the coil conductor 22B on the lower surface overlap one another in a planar view.

FIG. 15 is an equivalent circuit diagram of the foregoing antenna coil. In the antenna coil, the winding direction of the coil conductor 22A on the upper surface of the insulator sheet 21 is opposite (identical in the transparent view) to the winding direction of the coil conductor 22B on the lower surface of the insulator sheet 21. Thus, the equivalent circuit may be represented as in FIG. 15. In FIG. 15, inductors L1 and L2 correspond to the coil conductors 22A and 22B, respectively, and capacitors C1 and C2 are the capacitances generated mainly near leading end portions and terminating end portions of the coil conductors 22A and 22B. This antenna coil defines a resonance circuit that has a resonance frequency corresponding or substantially corresponding to a carrier frequency of communication signals.

Figure 16A:
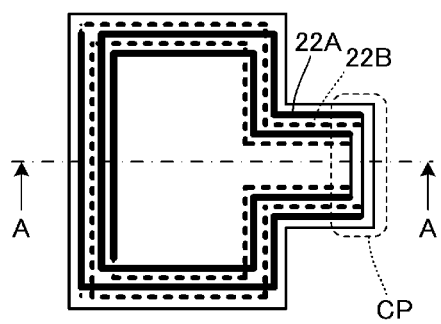
FIG. 16A is a plan view of an antenna coil according to the seventh preferred embodiment of the present invention.
Figure 16B:
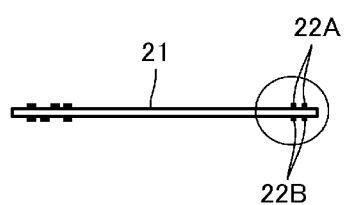
FIG. 16B is a cross sectional view of a portion A-A in FIG. 16A.
Figure 16D:
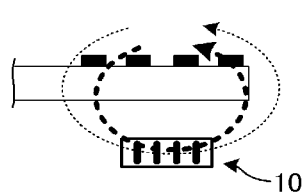
FIG. 16D is an enlarged cross sectional view of a comparison example.
Figure 16C:
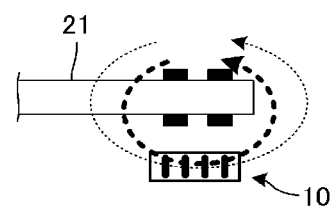
FIG. 16C is an enlarged view of an encircled portion in FIG. 16B.

FIG. 16A is a plan view of the antenna coil according to the present preferred embodiment, and FIG. 16B is a cross sectional view of the portion A-A in FIG. 16A. FIG. 16C is an enlarged view of the encircled portion in FIG. 16B. FIG. 16D is an enlarged cross sectional view of a comparison example.

As represented in FIG. 16A, the coil conductors 22A and 22B have relatively narrower line widths at the coupler portion CP. Further, in a planar view, the coil conductor 22A and the coil conductor 22B overlap one another at the coupler portion CP.

In FIG. 16C, a dashed line represents the magnetic flux that contributes to the coupling between the feed coil 10 and the antenna coil at the coupler portion CP of the antenna coil 20.

This configuration increases the magnetic flux that contribute to the coupling between the feed coil 10 and the antenna coil 20, thus improving the degree of coupling. As illustrated in FIG. 16D that serves as the comparison example, in the case where the winding of a coil conductor including the same number of turns is provided on a single surface, a less number of magnetic fluxes interlinks the feed coil 10 and the coupler portion of the antenna coil, making it difficult to achieve a higher degree of coupling.

In the example illustrated in FIGS. 16A and 16B, the coil conductors are provided on both sides of the insulator sheet. Alternatively, a coil conductor may be provided on each layer of a plurality of insulator layers, and the insulator layers on which the coil conductors are provided may be stacked to form a multilayer structure.

Eight Preferred Embodiment

Figure 17:
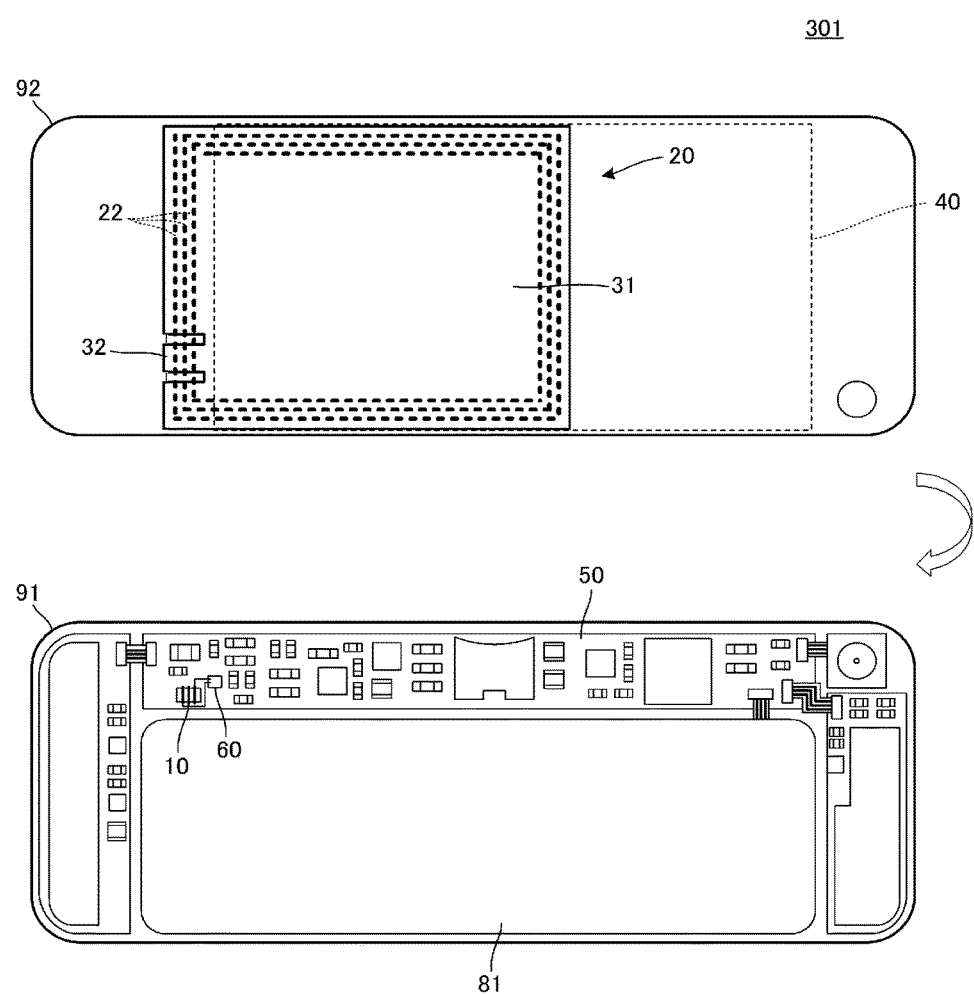
FIG. 17 is a view depicting a structure inside a casing of an communication terminal device 301 according to an eighth preferred embodiment of the present invention in a state where an upper casing 91 and a lower casing 92 are separated to expose the inside structure.

FIG. 17 is a view depicting the structure inside a casing of an communication terminal device 301 according to the eighth preferred embodiment of the present invention in a state where an upper casing 91 and a lower casing 92 are separated to expose the inside structure.

The feed coil 10 and a RFIC 60 defining and serving as the feed circuit are mounted on the mounting board 50 at the upper casing 91 side. The antenna coil 20 is attached to the lower casing 92 side with a double-sided adhesive tape to place the antenna coil 20 on a casing surface. In the present invention, the term "casing surface" does not necessary indicate or mean an exterior surface of the casing. As is the case with the present preferred embodiment, the antenna coil 20 may alternatively be disposed on an inner surface of the casing. Further, the antenna coil 20 may alternatively be buried inside the casing. The basic configuration of this antenna coil 20 is the same as the one illustrated in FIGS. 1A-1C or FIGS. 2A and 2B. The antenna coil 20 generates electromagnetic coupling with the feed coil 10.

The conductor pattern of the antenna coil may be directly drawn on the casing 92.

Two-dimensionally expanding conductor objects such as a battery pack 81 and the like are placed inside the upper casing 91. However, the first magnetic body portion 31 is present between the battery pack 81 and the coil conductor 22 of the antenna coil 20. Thus, the induction of eddy currents on the battery pack 81 is significantly reduced or prevented.

The conductor layer 40 such as a metal plate, a metal sheet, or the like to provide shielding may be present at the lower casing 92 side. In this case, again, the first magnetic body portion 31 is present between the conductor layer 40 and the coil conductor 22 of the antenna coil 20. Thus, the induction of eddy currents on the conductor layer 40 is significantly reduced or prevented.

Ninth Preferred Embodiment

Figure 18:
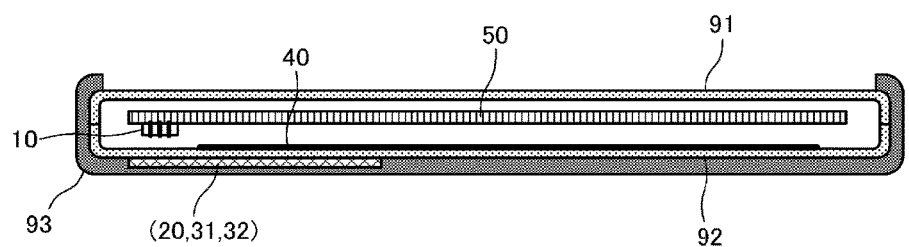
FIG. 18 is a cross sectional view of a principle portion of a communication terminal device according to a ninth preferred embodiment of the present invention.
Figure 19:
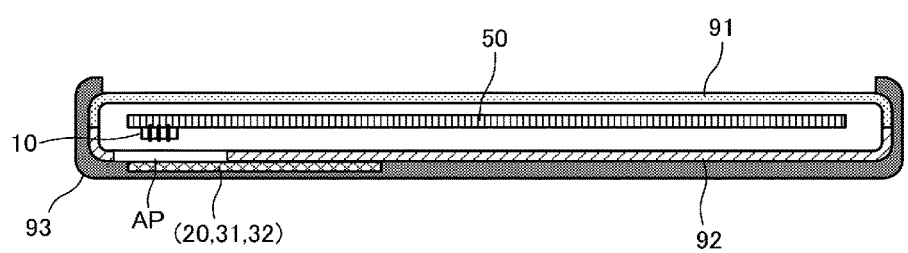
FIG. 19 is a cross sectional view of a principle portion of a communication terminal device according to a tenth preferred embodiment of the present invention.

FIG. 18 is a cross sectional view of a principle portion of a communication terminal device according to the ninth preferred embodiment of the present invention. In this communication terminal device 302, the feed coil 10 is mounted on the mounting board 50 at the upper casing 91 side. The shielding conductor layer 40 (corresponding to the "conductor portion" in a preferred embodiment of the present invention) is located at the lower casing 92 side.

The communication terminal device 302 is provided with a resin case 93 that serves as an attachment or an accessory cover. The case 93 covers the lower surface of a communication terminal device body. The case 93 is provided with the antenna coil 20, the first magnetic body portion 31, and the second magnetic body portion 32. In other words, the antenna coil 20 is disposed on the surface of the case 93. Here, the term "surface of the case 93" does not indicate or mean only the surface locating outside in the state where the case 93 is attached to the communication terminal device. As is the case with the present preferred embodiment, the antenna coil 20 may alternatively be disposed on a surface located inside the case 93. Further, the antenna coil 20 may alternatively be buried inside the case 93.

The configurations of the antenna coil 20, the first magnetic body portion 31, and the second magnetic body portion 32 may be similar to those described in the foregoing preferred embodiments. For example, a structure of the antenna coil 20, the first magnetic body portion 31, and the second magnetic body portion 32 illustrated in FIGS. 1A, 1B, and 1C is attached to the inner surface of the case 93. Alternatively, it may be buried inside the case 93. The case 93 is an example of the "cover" in a preferred embodiment of the present invention.

The conductor layer 40 preferably does not cover the whole surface of the lower casing 92, and includes a non-formation section (corresponding to the "opening" in a preferred embodiment of the present invention). In a planar view, the coupler portion of the antenna coil 20 overlaps the non-formation section of the conductor layer 40. Thus, as illustrated in FIG. 18, the feed coil 10 and the antenna coil 20 generate electromagnetic coupling in the state where the case 93 covers the lower surface of the communication terminal device body.

Tenth Preferred Embodiment

FIG. 10 is a cross sectional view of a principle portion of a communication terminal device according to the tenth preferred embodiment of the present invention. In this communication terminal device 303, the feed coil 10 is mounted on the mounting board 50 at the upper casing 91 side. The lower casing 92 is made of a metal. In other words, the casing includes the conductor portion.

As is the case with the ninth preferred embodiment of the present invention, the communication terminal device 303 is provided with the resin case 93 that defines and serves as an attachment or an accessory cover. The case 93 covers the lower surface of the communication terminal device body. The case 93 is provided with the antenna coil 20, the first magnetic body portion 31, and the second magnetic body portion 32. The configurations of the antenna coil 20, the first magnetic body portion 31, and the second magnetic body portion 32 may be similar to those described in the foregoing preferred embodiments.

The lower casing 92 is preferably provided with the opening AP. The opening AP is covered with an electrically non-conductive member such as a resin member, a glass member, or the like. This non-conductive member may be a logo mark and the like for the communication terminal device 303. In a planar view, the coupler portion of the antenna coil overlaps the opening AP. Thus, the antenna coil 20 and the feed coil 10 generate coupling in such a way that the magnetic field passes through the opening AP.

It is preferable that the size of the opening AP is more than about three times larger than the size of the feed coil 10. Here, the meaning of the size that is "more than three times larger than" is as follows. For example, in the case where the feed coil 10 is rectangular or substantially rectangular in shape, the lengths in both the vertical and horizontal directions are more than about three times larger than the original lengths. This configuration sufficiently improves the degree of coupling between the feed coil 10 and the antenna coil 20. Further, it is preferable that the size of the opening AP is comparable to the size of the coupler portion of the antenna coil 20. This configuration curbs the lowering of strength of the casing due to the formation of the opening AP and reduces the cost by using an appropriate size of the second magnetic body portion 32 at the coupler portion.

Eleventh Preferred Embodiment

In the foregoing preferred embodiments, there are described the examples in which the winding axis of the coil conductor 12 of the feed coil 10 preferably is perpendicular or substantially perpendicular to the direction along which the coil conductor 22 of the antenna coil 20 at the coupler portion CP extends in a planar view. However, the present invention is not limited thereto. In various preferred embodiments of the present invention, these directions may be any directions so long as the coil conductor 22 of the antenna coil 20 at the coupler portion and the coil conductor 12 of the feed coil 10 couple with one another via electromagnetic fields (mostly magnetic fields). Accordingly, it suffices that they are in a relationship where the magnetic flux interlinks. The winding axis of the coil conductor 12 of the feed coil 10 may not necessarily be perpendicular to the direction along which the coil conductor 22 of the antenna coil 20 at the coupler portion CP extends in a planar view so long as the winding axis of the coil conductor 12 of the feed coil 10 is not parallel to the direction along which the coil conductor 22 of the antenna coil at the coupler portion CP extends. In other words, it suffices that they are in the relationship of "skewed positions".

Figure 20:
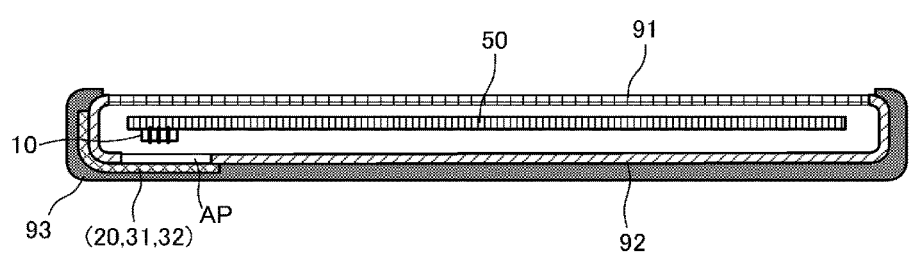
FIG. 20 is a cross sectional view of a principle portion of a communication terminal device according to an eleventh preferred embodiment of the present invention.

FIG. 20 is a cross sectional view of a principle portion of a communication terminal device according to the eleventh preferred embodiment of the present invention. In this communication terminal device 304, the feed coil 10 is mounted on the mounting board 50. The upper casing 91 is made of a glass to protect a display included in the communication terminal device, and the lower casing 92 is made of a metal.

As is the case with the ninth preferred embodiment of the present invention, the communication terminal device 304 is provided with a resin case 93 that defines and serves as an attachment or an accessory cover. The case 93 covers the lower surface of the communication terminal device body. The case 93 is provided with the antenna coil 20, the first magnetic body portion 31, and the second magnetic body portion 32. The configurations of the antenna coil 20, the first magnetic body portion 31, and the second magnetic body portion 32 may be similar to those described in the foregoing preferred embodiments.

The present preferred embodiment is different from the tenth preferred embodiment of the present invention in that a unit including the antenna coil 20, the first magnetic body portion 31, and the second magnetic body portion 32 curves from the bottom surface to the side surface (end surface) of the lower casing 92. In this case, the major direction of the magnetic fluxes inclines from the direction normal to a principle surface of the communication terminal device 304 toward the side surface to some extent. This allows the communications to be established while holding the communication terminal device 304 at an inclined position with respect to the reader/writer-side antenna. This improves operability.

Figure 21A:
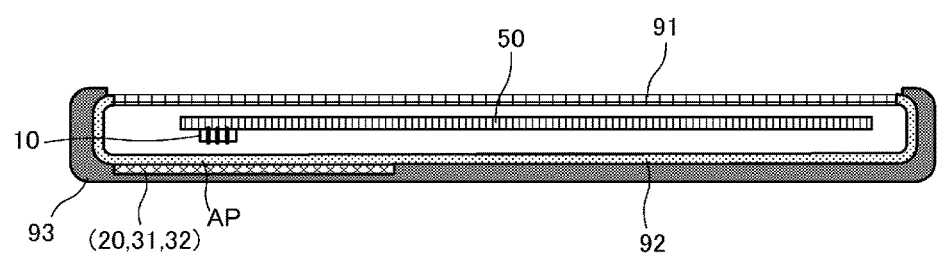
FIG. 21A and FIG. 21B are cross sectional views of another communication terminal device according to the eleventh preferred embodiment of the present invention.
Figure 21B:
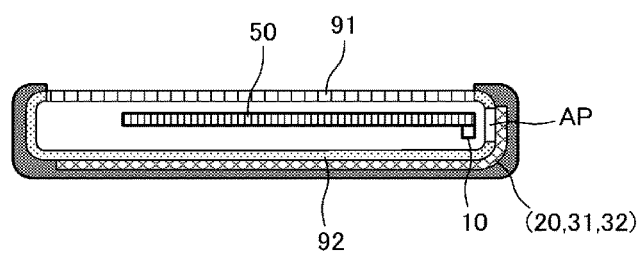

FIG. 21A and FIG. 21B are cross sectional views of another communication terminal device 305 according to the present preferred embodiment. The communication terminal device 305 is different from the communication terminal device 304 illustrated in FIG. 20 in that the communication terminal device 305 includes the opening AP at the side surface of the casing and that the antenna coil 20 is arranged in such a way that the coupler portion of the antenna coil 20 overlaps the opening AP in side view. In other words, a unit including the first magnetic body portion 31 and the second magnetic body portion 32 curves from the bottom surface to the side surface of the lower casing 92. In this case, the opening AP is not present on a principle surface of the communication terminal device 305. Thus, the opening AP does not stand out.

Alternatively, instead of forming the opening AP at the side surface of the metal casing of the communication terminal device, the whole side surface of the casing may be defined by an electrically non-conductive member such as a resin.

Further, in the foregoing preferred embodiments, the antenna coil having a structure in which the coil conductor 22 (or 22A and 22B) is provided on the insulator sheet 21 is described as an example. However, the insulator sheet 21 is not essential. Further, in some of the foregoing preferred embodiments, the configuration in which, of two principle surfaces of the insulator sheet 21, the coil conductor 22 is provided on the principle surface at far side from the feed coil as an example. However, the coil conductor 22 may alternatively be provided on the principle surface at near side from the feed coil 10.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication terminal device comprising:
   a casing;
   a feed circuit disposed inside the casing;
   a communication terminal device cover disposed outside the casing; and
   an antenna device including:
      a feed coil including a coil conductor and being connected to a feed circuit; and
      an antenna coil including a coil conductor, a portion of the antenna coil being a coupler portion that electromagnetically couples with the feed coil; wherein
   a winding axis of the coil conductor of the feed coil and a direction along which the coil conductor of the antenna coil at the coupler portion are skewed relative to each other;
   at a location other than the coupler portion, a first magnetic body portion is arranged at a feed coil side of the antenna coil;
   at the coupler portion, a second magnetic body portion is arranged at a side of the antenna coil opposite to the feed coil side; and
   the antenna coil is disposed on a surface of or inside the communication terminal device cover.

2. The communication terminal device according to claim 1, further comprising:
   a mounting board disposed inside the casing; wherein
   the feed coil is mounted on the mounting board.

3. The communication terminal device according to claim 1, further comprising:
   a conductor layer disposed inside the casing; wherein
   the first magnetic body portion is arranged between the conductor layer and the antenna coil.

4. The communication terminal device according to claim 2, further comprising:
   a conductor layer disposed inside the casing; wherein
   the first magnetic body portion is arranged between the conductor layer and the antenna coil.

5. The communication terminal device according to claim 1, wherein
   the coil conductor of the feed coil is such that an entirety of a winding expands along a direction of the winding axis of the feed coil; and
   the coil conductor of the antenna coil has a spiral shape or a ring shape.

6. The communication terminal device according to claim 1, wherein
   the antenna coil includes an insulator sheet on which the coil conductor of the antenna coil is provided;
   the first magnetic body portion and the second magnetic body portion are sheet-shaped; and
   the first magnetic body portion and the second magnetic body portion are attached to the insulator sheet.

7. The communication terminal device according to claim 6, wherein
   the insulator sheet includes a slit;
   the first magnetic body portion and the second magnetic body portion are portions of a single magnetic body; and
   the second magnetic body portion of the single magnetic body is inserted into the slit of the insulator sheet.

8. The communication terminal device according to claim 1, wherein a line width of the coil conductor of the antenna coil is narrower at the coupler portion compared to that at a section other than the coupler portion.

9. The communication terminal device according to claim 1, wherein the coil conductor of the feed coil is provided on a magnetic base.

10. The communication terminal device according to claim 1, wherein the coil conductor of the antenna coil includes a plurality of layers.

11. A communication terminal device comprising:
    a casing;
    a feed circuit disposed inside the casing; and
    an antenna device including:
       a feed coil including a coil conductor and being connected to a feed circuit; and
       an antenna coil including a coil conductor, a portion of the antenna coil being a coupler portion that electromagnetically couples with the feed coil; wherein
    a winding axis of the coil conductor of the feed coil and a direction along which the coil conductor of the antenna coil at the coupler portion are skewed relative to each other;
    at a location other than the coupler portion, a first magnetic body portion is arranged at a feed coil side of the antenna coil;
    at the coupler portion, a second magnetic body portion is arranged at a side of the antenna coil opposite to the feed coil side;
    the antenna coil is disposed on a surface of or inside the casing;
    the casing includes a conductor portion;
    an opening is provided in the conductor portion; and in a planar view, the coupler portion of the antenna coil overlaps the opening.

12. The communication terminal device according to claim 11, wherein a size of the opening is more than about three times larger than a size of the feed coil.

13. The communication terminal device according to claim 11, wherein
the coil conductor of the feed coil is such that an entirety of a winding expands along a direction of the winding axis of the feed coil; and
the coil conductor of the antenna coil has a spiral shape or a ring shape.

14. The communication terminal device according to claim 11, wherein
the antenna coil includes an insulator sheet on which the coil conductor of the antenna coil is provided;
the first magnetic body portion and the second magnetic body portion are sheet-shaped; and
the first magnetic body portion and the second magnetic body portion are attached to the insulator sheet.

15. The communication terminal device according to claim 14, wherein
the insulator sheet includes a slit;
the first magnetic body portion and the second magnetic body portion are portions of a single magnetic body; and
the second magnetic body portion of the single magnetic body is inserted into the slit of the insulator sheet.

16. The communication terminal device according to claim 11, wherein a line width of the coil conductor of the antenna coil is narrower at the coupler portion compared to that at a section other than the coupler portion.

17. The communication terminal device according to claim 11, wherein the coil conductor of the feed coil is provided on a magnetic base.

18. The communication terminal device according to claim 1, wherein the coil conductor of the antenna coil includes a plurality of layers.

19. A communication terminal device cover for use in the communication terminal device according to claim 11.

* * * * *